United States Patent
Kulkarni et al.

(10) Patent No.: US 11,329,885 B2
(45) Date of Patent: May 10, 2022

(54) CLUSTER CREATION USING SELF-AWARE, SELF-JOINING CLUSTER NODES

(71) Applicant: International Business Machines Corporation, Armonk, NY (US)

(72) Inventors: Shrinivas Kulkarni, Bangalore (IN); Rachit Arora, Bangalore (IN); Dharmesh Jain, Bangalore (IN); Sunil R. Ganatra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/014,235

(22) Filed: Jun. 21, 2018

(65) Prior Publication Data
US 2019/0394093 A1 Dec. 26, 2019

(51) Int. Cl.
| | |
|---|---|
| *H04L 12/24* | (2006.01) |
| *G06F 9/455* | (2018.01) |
| *G06F 16/11* | (2019.01) |
| *H04L 41/12* | (2022.01) |
| *H04L 41/0654* | (2022.01) |

(52) U.S. Cl.
CPC .......... *H04L 41/12* (2013.01); *G06F 9/45558* (2013.01); *G06F 16/116* (2019.01); *H04L 41/0654* (2013.01); *G06F 2009/4557* (2013.01); *G06F 2009/45595* (2013.01)

(58) Field of Classification Search
CPC .......................... G06F 16/285; H04L 41/5045
See application file for complete search history.

(56) References Cited

U.S. PATENT DOCUMENTS

| | | | | |
|---|---|---|---|---|
| 9,946,577 | B1* | 4/2018 | Stafford | H04L 67/10 |
| 2008/0313715 | A1* | 12/2008 | Nardone | H04L 63/08 |
| | | | | 726/4 |
| 2009/0265449 | A1* | 10/2009 | Krishnappa | H04L 61/2038 |
| | | | | 709/220 |
| 2011/0219093 | A1* | 9/2011 | Ragunathan | G06F 15/16 |
| | | | | 709/207 |
| 2011/0320739 | A1* | 12/2011 | Ragunathan | G06F 9/5055 |
| | | | | 711/141 |
| 2017/0060609 | A1 | 3/2017 | Cropper et al. | |
| 2017/0339008 | A1* | 11/2017 | Dion | H04L 67/10 |
| 2017/0346690 | A1* | 11/2017 | Dorado | H04L 41/5045 |

(Continued)

FOREIGN PATENT DOCUMENTS

| | | |
|---|---|---|
| CN | 106506233 A | 3/2017 |
| CN | 106648801 A | 5/2017 |

*Primary Examiner* — Oleg Survillo
*Assistant Examiner* — Christopher P Cadorna
(74) *Attorney, Agent, or Firm* — William H. Hartwell; Hunter E. Webb; Keohane & D'Alessandro, PLLC

(57) ABSTRACT

Disclosed embodiments provide cluster creation using self-joining cluster nodes. Each node within a cluster is assigned a role of master or non-master. A master node initializes and creates a cluster. A non-master, or "role" node initializes and joins a cluster established by the master. If the master has not yet initialized, the non-master node waits until the master node is operational and then joins the cluster. A description file associated with each node describes the services and configuration required for the node's assigned role. In this way, non-master nodes can be spawned independently of the master node, providing a greater level of scalability, improved fault tolerance, and increased availability.

14 Claims, 10 Drawing Sheets

(56) References Cited

U.S. PATENT DOCUMENTS

2018/0048545 A1\* 2/2018 Mishalov ............ G06F 9/45558
2018/0198680 A1\* 7/2018 Mladin ................ H04W 24/02
2018/0217818 A1\* 8/2018 Douglas ................... G06F 8/10
2018/0316625 A1\* 11/2018 Xu ........................ H04L 45/126
2019/0278938 A1\* 9/2019 Greene ................ G06F 9/5072

\* cited by examiner

```
cluster_runtime: Spark            ~300
node_scaling:
    instances: 1                  ~302
resources:
    cpu: 1                        ~304
    memory_gb: 0.5
    disk_size_gb: 10
role:                             ~306
    master: 0
    database: 1
    webui: 0
service_lists:                    ~308
    service_list_A:
        php-cgi: 5.1
        dropbear: 7.4
        dbus: 4.3
        portmap: 1.7
    service_list_B:               ~310
        php-cgi: 5.1
        dropbear: 7.4
        portmap: 1.8
        snmp: 2.0
```

FIG. 3

```
processor_type: AMD Opeteron
cores: 8
mem: 16GB
storage: 4TB                        ⎫ 1004
app_name: content_delivery03
node_list:
  type: database01
  min_instance: 4
  type: indexer01
  min_instance: 2
  type: encryptor03:                ⎫ 1008
  min_instance: 12
  type: streamer02:
  min_instance: 16
  type: webui03
  min_instance: 32
```

CLUSTER CREATION USING SELF-AWARE, SELF-JOINING CLUSTER NODES

FIELD

The present invention relates generally to computer systems and, more particularly, to cluster creation using self-joining cluster nodes.

BACKGROUND

In the field of computer systems, a container image is a lightweight, stand-alone, executable package of software that includes everything needed to perform a role that includes one or more tasks. The container can include code, runtime libraries, system tools, system libraries, and/or configuration settings. Containerized software operates with some independence regarding the host machine/environment. Thus, containers serve to isolate software from its surroundings, increasing the portability and scalability of such processes. Thus, computer cluster nodes implemented by containers and virtual machines have become an important component of deployed enterprise systems. It is therefore desirable to have improvements in the management and orchestration of computer cluster nodes in a computer system.

SUMMARY

In one embodiment, there is provided a computer-implemented method for cluster creation, comprising: obtaining a cluster configuration description; deriving a node list from the cluster configuration description, wherein the node list includes a plurality of nodes; creating a node description for each node in the node list; determining a corresponding host machine for each node in the node list; and sending a start command for each node to its corresponding host machine.

In another embodiment, there is provided an electronic computing device, comprising: a processor; a memory coupled to the processor, the memory containing instructions, that when executed by the processor, perform the steps of: obtaining a role for a node; obtaining a service list for the node; starting the node; executing a cluster formation procedure based on the role; and starting one or more services from the service list.

In yet another embodiment, there is provided a computer program product for an electronic computing device comprising a computer readable storage medium having program instructions embodied therewith, the program instructions executable by a processor to cause the electronic computing device to: obtain a cluster configuration description; derive a node list from the cluster configuration description, wherein the node list includes a plurality of nodes; create a node description for each node in the node list; determine a corresponding host machine for each node in the node list; and send a start command for each node to its corresponding host machine.

BRIEF DESCRIPTION OF THE DRAWINGS

Features of the disclosed embodiments will be more readily understood from the following detailed description of the various aspects of the invention taken in conjunction with the accompanying drawings.

FIG. 3 shows an exemplary node description file in accordance with illustrative embodiments.

FIG. 10 is an exemplary cluster configuration description in accordance with embodiments of the present invention.

Figure 1:
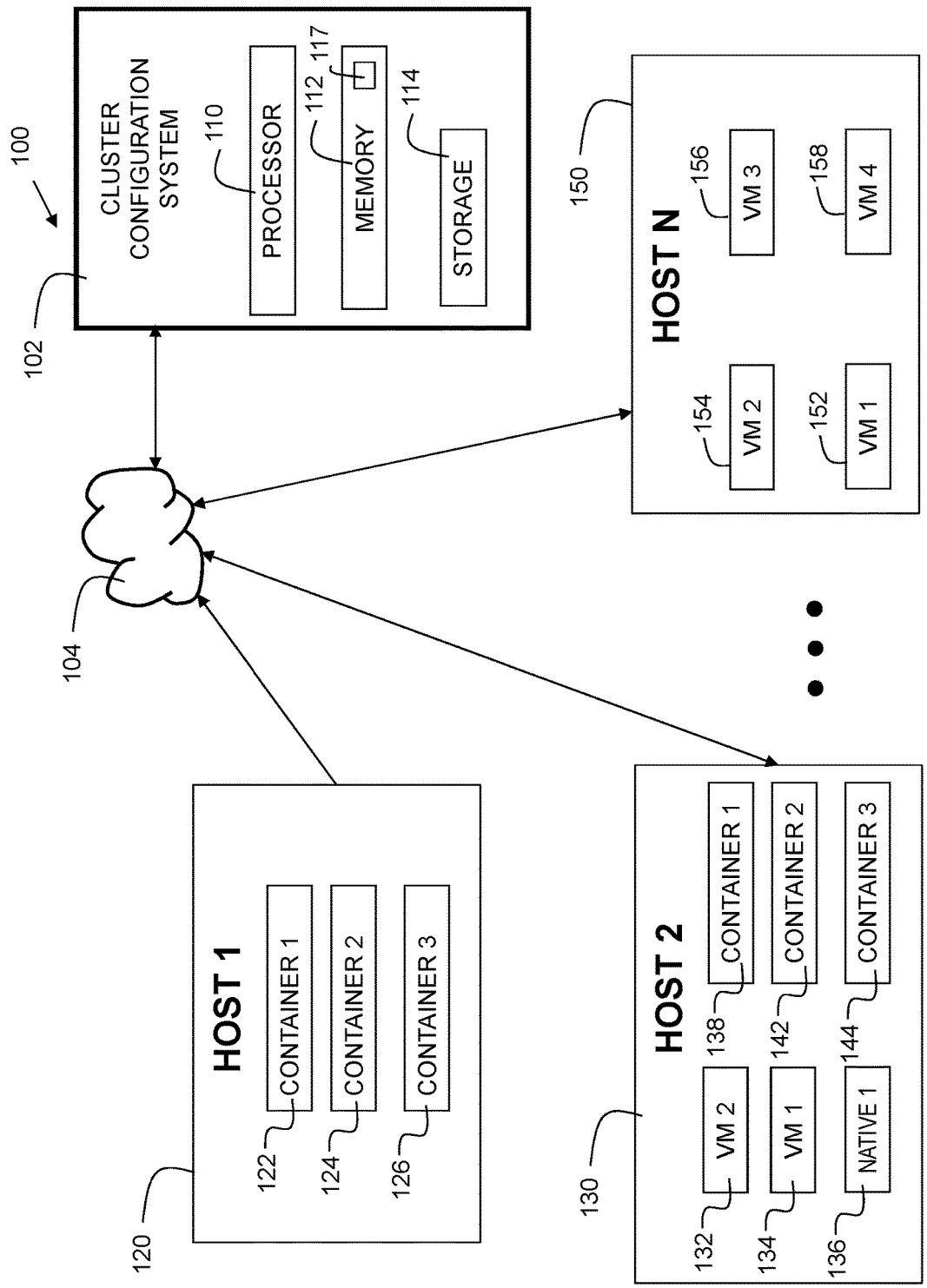
FIG. 1 shows an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide cluster creation using self-joining cluster nodes. Each node within a cluster is assigned a role of master or non-master. A master node initializes and creates a cluster. A non-master, or "role" node initializes and joins a cluster established by the master. If the master has not yet initialized, the non-master node waits until the master node is operational, and then joins the cluster. A description file associated with each node describes the services and configuration required for the node's assigned role. In this way, non-master nodes can be spawned independently of the master node, providing a greater level of scalability, improved fault tolerance, and increased availability.

In an orchestration environment (e.g., Kubernetes), typically applications are scaled out horizontally by merely setting a higher value for a replication factor. This method makes it easy to automatically scale. However, this approach requires that the application is written such that it has no dependency on any of the other replicas. In cases where it is desired to operate a distributed clustered software like Hadoop or Spark, especially the one managed by a cluster manager like Apache Ambari, there is a large amount of orchestration required to scale out by adding more compute nodes to the existing cluster. These clusters are typically managed by a cluster manager such as Apache Ambari, which maintains list of nodes belonging to the cluster, the role each node plays, and the processes to be run on each of the nodes.

In this type of cluster, one or more newly added nodes are registered to the Ambari server. It becomes necessary to convey to Ambari which group each of the newly added nodes should belong to, which in turn determines what processes should be run on each of those nodes.

In order to accomplish this, APIs such as the addNodes API of Ambari are used by passing a list of {node, host-group} mappings are used. In a situation when such a cluster is built using docker containers, a dedicated orchestrator identifies on which hosts the containers should be initialized (started), creates the appropriate containers, starts the prerequisite services like the Ambari server on the master node, the Ambari agent, and/or monitoring software on all nodes, etc. Once this phase is over, and when all nodes join the network, the orchestrator assigns the different roles each node is playing and comes up with a list of {node, host-group} mappings. It then passes this on to the Ambari server and invokes the createCluster API. The orchestrator then monitors the progress of cluster creation.

In a situation where it is desired to scale out the cluster by adding more nodes, the existing method expects the centralized orchestrator to again figure out similar orchestration to add new nodes, but this time it has to invoke the addNodes API of Ambari. If there is any failure, the orchestrator has to handle the failures. The failures can occur at various locations. For example, one of the nodes may fail to come up during Ambari API execution or during container creation or while starting the prerequisite services. Another possible failure point could be when an Ambari agent tries to join the network. The list of errors, if large, can be a burden for the orchestrator to handle. Furthermore, because different nodes may play different roles, the processes started in them varies, as does the corresponding error handling scenarios. While having a centralized orchestrator helps to monitor the orchestration from one place, it becomes difficult to handle errors.

Considering another scenario, specifically with an orchestrator such as Kubernetes, when Kubernetes (or Swarm or the like) detects that an underlying worker node fails or degrades, they move the containers running on that worker node to another healthy worker node (e.g., container instance). Since this can happen at any time, and outside the knowledge of a centralized cluster orchestrator, it can create complications.

Disclosed embodiments provide an independent entity outside of the orchestration logic to enable the processing of thousands of concurrent requests, to enable the scaling and fault tolerance required in modern computer systems. Additionally, since the orchestration can take several minutes to complete, the independent entity operates in a highly available environment that withstands failure of the orchestration process itself. In embodiments, nodes know how to join a cluster and also what their role is in the cluster, thereby obviating the need for a central orchestrator. Embodiments can include restarting a node upon detecting a failure condition. That is, in some cases, one or more nodes can get restarted in another machine and/or rebooted from failure, and then those nodes join the cluster and become functional by themselves, without the need for involvement from an orchestrator. Thus, disclosed embodiments serve to increase the scalability and robustness of distributed, cluster-based computer systems.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 shows an environment 100 for embodiments of the present invention. System 102 includes a processor 110, memory 112, and storage 114. Memory 112 stores instructions 117, which when executed by the processor, cause system 102 to implement embodiments of the present invention. System 102 is connected to network 104. Network 104 may be the Internet, a wide area network, local area network, or other suitable network.

Computers that implement a cluster of nodes are shown also connected to the network. These computers are Host 1 120, Host 2 130, and Host N 150. Host 1 120, Host 2 130, and Host N 150 are computer systems which may include thereon one or more containers, one or more virtual machines (VMs), or one or more native applications. These host machines are typically self-sufficient, including a processor (or multiple processors), memory, and instructions thereon. Host 1 120, Host 2 130, and Host N 150 are each computers that together implement a cluster. Note that while three hosts are shown in FIG. 1, in practice, embodiments may have many more than three hosts.

Host 1 120 includes instances of three containers: Container 1 122, Container 2 124, and Container 3 126. A container image is a lightweight, stand-alone, executable package of software that includes everything needed to perform a role that includes one or more tasks. The container can include code, runtime libraries, system tools, system libraries, and/or configuration settings. Containerized software operates with some independence regarding the host machine/environment. Thus, containers serve to isolate software from their surroundings.

Host 2 130 includes instances of virtual machines, containers, and a native application. The containers are Container 1 138, Container 2 142, and Container 3 144. The Native 1 136 is a native application, native instruction set, or other native program that is implemented specially for the particular model of the computer or microprocessor, rather than in an emulation mode. The virtual machines are VM 2 132 and VM 1 134. Thus, in embodiments, the host can include a mix of containers, virtual machines, and/or native applications.

Host N includes instances of four virtual machines: VM 2 154, VM 1 152, VM 3 156, and VM 4 158. A virtual machine (VM) is an operating system or application environment that is installed as software, which imitates dedicated hardware. The virtual machine imitates the dedicated hardware, providing the end user with the same experience on the virtual machine as they would have on dedicated hardware.

Accordingly, in some embodiments, hosts can include only a single type of environment, such as containers, virtual machines, or native applications. Alternatively, a host may include a mix of such, like in the example of Host 2 130. In some cases, instances of the container, virtual machine, or native application may be replicated on more than one host. This is shown here as a first instance of Container 1 122, Container 2 124, and Container 3 126 are on Host 1 120, and a second instance of each are Container 1 138, Container 2 142, and Container 3 144 on Host 2. In addition, first instances of VM 2 132 and VM 1 134 are on Host 2 130, and second instances of VM 2 154 and VM1 152 are on Host N 150.

The cluster in the example is managed by cluster configuration system 102. System 102 may use one or more programs to deploy, scale, and manage machines and software in the cluster as an orchestration environment. Non-limiting examples of such frameworks/programs are Kubernetes, Apache Hadoop, and Docker.

Kubernetes is an open-source system for automating deployment, scaling, and management of containerized applications. It assembles groups of containers, which together form an application, into logical units to make management and discovery easier.

The Apache Hadoop software library is a framework that enables distributed processing of large data sets across clusters of computers via simple programming models. It is made to scale up from single servers to potentially thousands of machines, with each capable of local computation and storage. Instead of relying on hardware to provide high availability, the library itself can detect and deal with failures at the application layer. Accordingly, it provides a highly available service on top of a cluster of computers, each of which may be subject to failures.

Docker is a computer program that provides operating-system-level virtualization (i.e., containerization). Containers utilize the resource isolation features of the OS kernel (i.e., cgroups and kernel namespaces), and a union-capable file system (i.e., OverlayFS and others). This allows separate containers to run within a single operating system instance, circumventing the overhead of starting and maintaining virtual machines.

In embodiments, system 102 obtains a cluster configuration description, and derives a node list. In some embodiments, deriving a node list comprises deriving a node list including at least one container. For example, Host 1 120 and Host 2 130 each include instances of containers. In some embodiments, deriving a node list comprises deriving a node list including at least one virtual machine. For example, Host 2 130 and Host N 150 each include instances of virtual machines. In some embodiments, deriving a node list comprises deriving a node list including at least one container and at least one virtual machine, as shown at Host 2 130. In some embodiments, deriving a node list comprises deriving a node list including at least one native application, as shown at 136 in Host 2 130.

Figure 2:
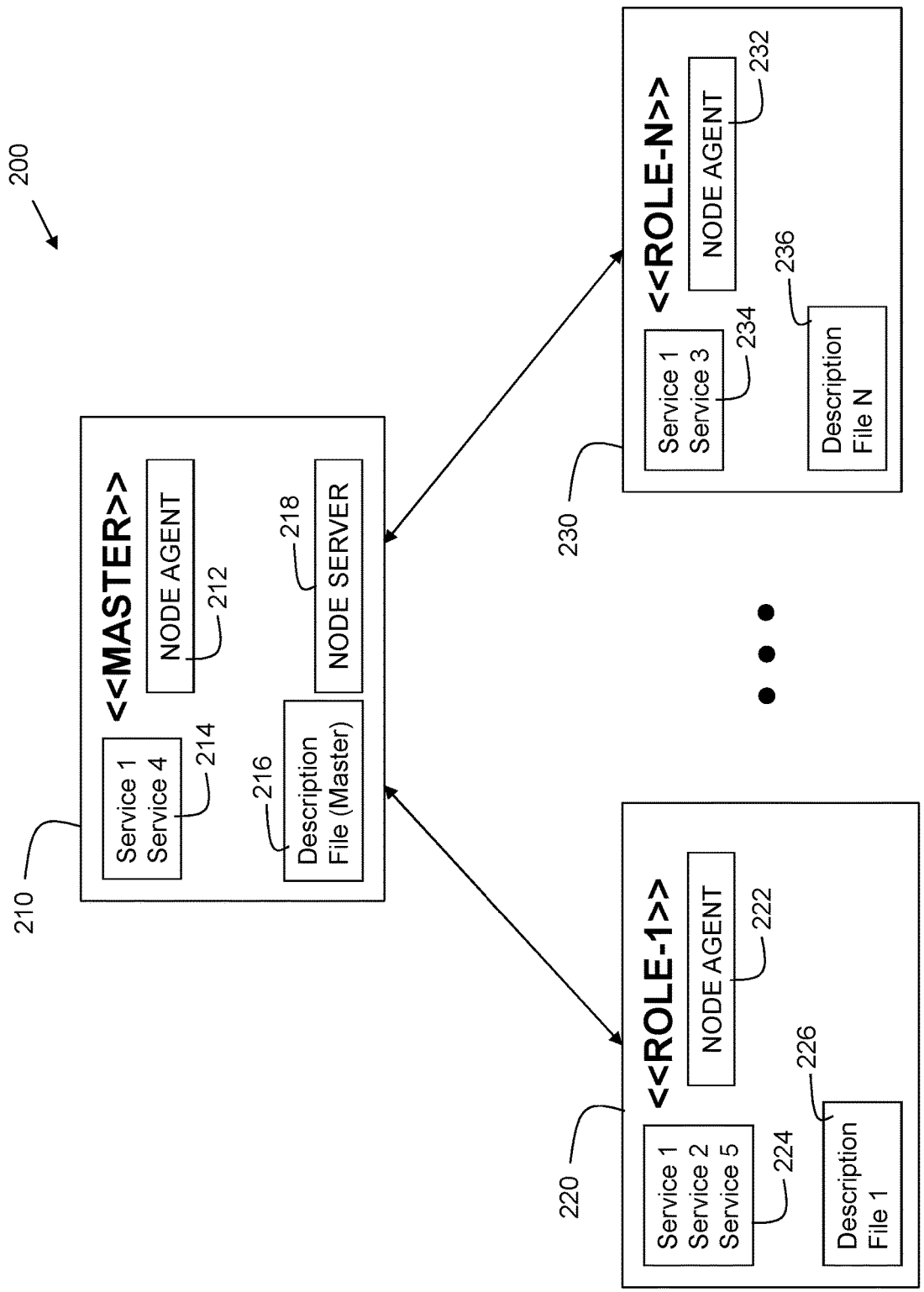
FIG. 2 shows multiple nodes in accordance with embodiments of the present invention.

FIG. 2 shows a diagram 200 of multiple nodes in accordance with embodiments of the present invention. Three nodes are shown of the cluster, though in implementations, many more than three may be included. Master node 210 monitors and tracks formation of the cluster. It includes a node agent 212, which functions to communicate with server instances such as Node Server 218. Master node 210 includes a service list 214, which includes Service 1 and Service 4. Node 210 also includes a Description File (Master) 216.

The Role 1 node 220 includes a node agent 222, which receives instructions from node server 218 on the master node 210. It includes a service list 224 which lists the services available on the node, which can perform functions such as encryption, data processing, storage, etc. Service list 224 includes Service 1, Service 2, and Service 5. Node 220 also includes Description File 1 226. The description file gives the node instructions so it can initialize as far as possible until the master node is ready.

The Role 2 node 230 includes a node agent 232, which receives instructions from node server 218 on the master node 210. It includes a service list 234 which lists the services available on the node, which can include functions such as encryption, data processing, storage, etc. Service list 234 includes Service 1 and Service 3. Node 230 also includes Description File N 236. The description file gives the node instructions so it can initialize as far as possible until the master node is ready. Note that while the example in FIG. 2 shows three nodes, in some embodiments, there can be many more nodes used within a cluster. The nodes can be distributed amongst multiple host machines as shown in FIG. 1.

FIG. 3 shows an exemplary node description file 300 in accordance with illustrative embodiments. In embodiments, a node description file is created. In some embodiments, creating a node description file includes creating a first subset of configuration information and a second subset of configuration information. The first subset is for a first cluster runtime environment, and the second subset is for a second cluster runtime environment.

Embodiments may further include determining a cluster runtime environment. The first subset of configuration information or the second subset of configuration information may then be selected based on the cluster runtime environment.

For example, a first runtime environment may include Hadoop MapReduce, and a second runtime environment may include Spark. The node description file for the second runtime environment, Spark, is shown in FIG. 3. In some embodiments, creating a node description file comprises creating a file in a YAML format. Although shown here as a YAML format, any suitable format may be used in implementations.

In embodiments, the node description file may include one or more items, such as number of instances (section 302), processor requirements, memory requirements (section 304), and/or role of the node (section 306). Accordingly, in some embodiments, creating a node description file includes creating a processor requirements entry, shown as 1 cpu at 304. In some embodiments, creating a node description file includes creating a memory requirements entry, shown at 0.5 gigabytes at 304. In some embodiments, creating a node description file includes indicating a role of the node, which is indicated in the file here as a database role at 306.

In some embodiments, creating a node description file includes creating a service list. In the example, service list A is shown at 308 and service list B is shown at 310. Service list A 308 includes php-cgi version 5.1, dropbear version 7.4, dbus version 4.3, and portmap version 1.7. Service list B 310 includes php-cgi version 5.1, dropbear version 7.4, portmap version 1.8, and snmp version 2.0. In some embodiments, service list A 308 may be services used for a first cluster runtime environment (e.g., Spark), and service list B 310 may be services used for a second runtime environment (e.g., Hadoop MapReduce). Note that the services in the service lists 308 and 310 are exemplary, and embodiments may include more than two lists, and may include more or fewer services per list. In some embodiments, there may be common services and versions within the lists. For example, both service list A 308 and service list B 310 contain php-cgi version 5.1. In some embodiments, there may be common services with differing versions within the lists. For example, service list A 308 contains portmap version 1.7, while service list B 310 contains portmap version 1.8. In some cases, service lists may contain services that are not in one or more of the other service lists. For example, service list A 308 contains the dbus service, which does not appear in service list B 310. Similarly, service list B contains an snmp service, which does not appear in service list A 308. By using a node description file such as depicted in FIG. 3, multiple cluster runtime environments can be supported. The node can self-start and load the proper services for the corresponding cluster runtime environment by reading the appropriate service list.

Figure 4:
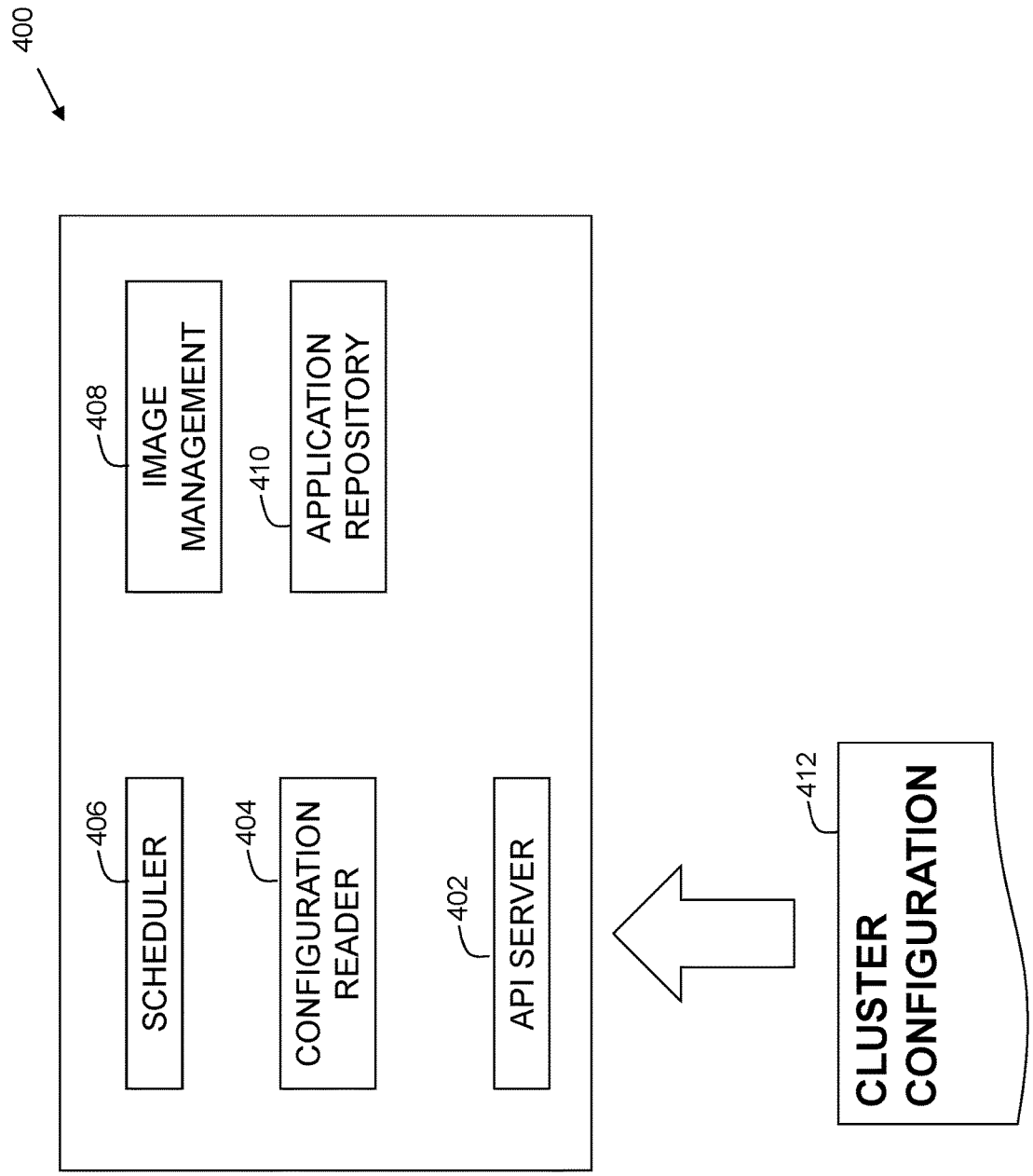
FIG. 4 shows a block diagram of modules used in accordance with embodiments of the present invention.

FIG. 4 shows a block diagram 400 of modules used in accordance with embodiments of the present invention. The modules 402, 404, 406, 408, and 410 may be implemented with instructions executing on processor 110 of cluster configuration system 102 (FIG. 1). The API server 402 module is the interface through which other systems can interact with system 102. The API server 400 may include support for RESTful APIs, such as HTTP GET and POST commands. In embodiments, data may be exchanged through a structured format such as XML, SOAP, JSON, or other suitable format. The APIs can be used to initiate creation of node description files to allow the creation of the nodes required to implement a cluster-based computer application.

Configuration reader module 404 reads cluster configuration to determine what each node requires in terms of images, libraries, configuration files, and/or other binaries. Scheduler module 406 determines on which machine the nodes (in the form of virtual machines and/or containers) are to be instantiated. This can be based on node resource requirements, such as those depicted in section 304 of the node description file in FIG. 3. The image management module 408 contains an index of VM/container images (e.g., snapshots of the VM/container to be used in the node creation). Application repository 410 stores additional binaries, libraries, source tarballs, and/or other files necessary for node creation.

Cluster configuration 412 describes the nodes needed to create the cluster. This may come from the output of a compiler, toolchain, or other utility, such as SADDLE, for design of cluster-based computer applications. In embodiments, the cluster configuration is input to the cluster configuration system 102 (FIG. 1) via one or more API calls supported by API server 402.

Figure 5:
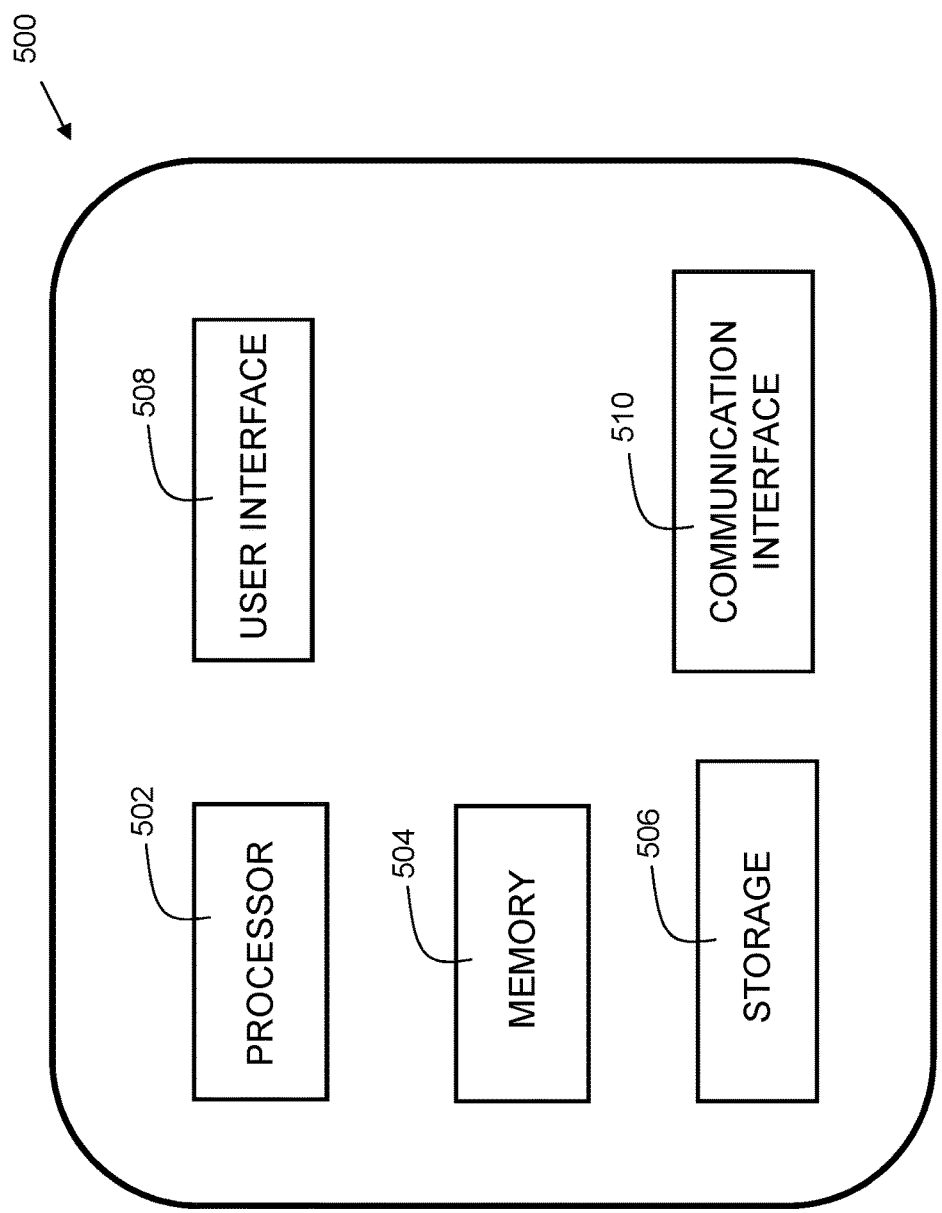
FIG. 5 is a block diagram of an electronic computing device in accordance with embodiments of the present invention.

FIG. 5 is a block diagram of an electronic computing device 500 in accordance with embodiments of the present invention. This represents any of a host machine (120, 130, 150) or system 102 of FIG. 1. Device 500 includes a processor 502, which is coupled to a memory 504. Memory 504 may include dynamic random-access memory (DRAM), static random-access memory (SRAM), magnetic storage, and/or a read only memory such as flash, EEPROM, optical storage, or other suitable memory. In some embodiments, the memory 504 may not be a transitory signal per se.

Device 500 may further include storage 506. In embodiments, storage 506 may include one or more magnetic storage devices such as hard disk drives (HDDs). Storage 506 may additionally include one or more solid state drives (SSDs).

Device 500 may, in some embodiments, include a user interface 508. This may include a display, keyboard, mouse, or other suitable interface. In some embodiments, the display may be touch-sensitive.

The device 500 further includes a communication interface 510. The communication interface 510 may be a wired communication interface that includes Ethernet, Gigabit Ethernet, or the like. In embodiments, the network interface 510 may include a wireless communication interface that includes modulators, demodulators, and antennas for a variety of wireless protocols including, but not limited to, Bluetooth™, Wi-Fi, and/or cellular communication protocols for communication over a computer network.

In embodiments, instructions are stored in memory 504. The instructions, when executed by the processor 502, cause the electronic computing device 500 to perform steps. The steps may include the following actions. A role is obtained for a node. A service list is obtained for the node. The node is initialized. A cluster formation procedure is executed based on the role. One or more services from the service list is started. In some embodiments, the steps further include, in response to identifying the obtained role as a master, starting a node server process. A node agent process is then started, and a cluster database is initialized.

Figure 6:
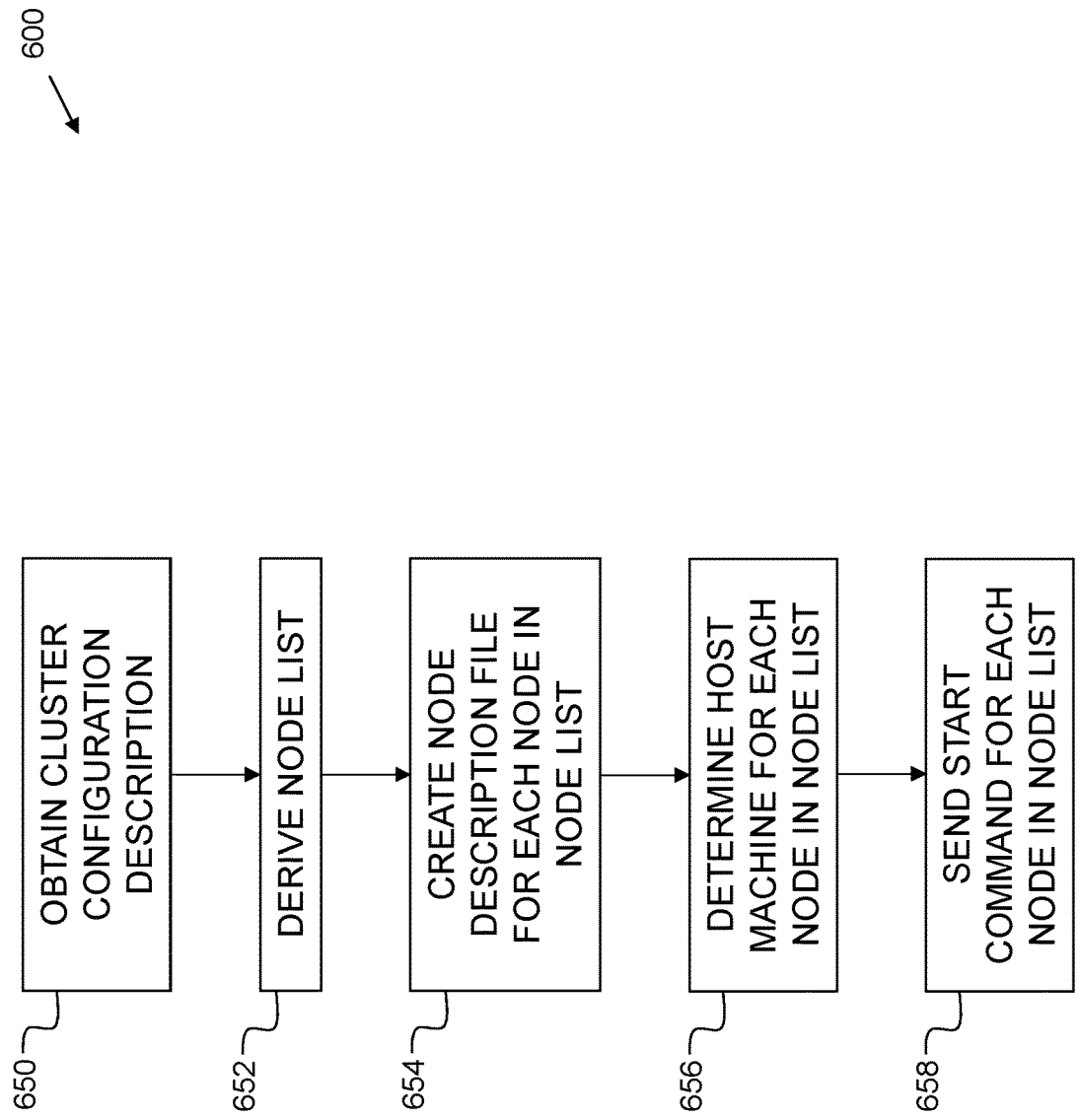
FIG. 6 is a flowchart indicating process steps for embodiments of the present invention.

FIG. 6 is a flowchart 600 indicating process steps for embodiments of the present invention. At 650, a cluster configuration description is obtained. In embodiments, the cluster configuration description contains a list of node types and minimum number of instances of each node type needed to form the cluster. At 652, a node list is derived, based on information in the cluster configuration description. At 654, a node description file is created for each node in the node list. At 656, a host machine is determined for each node in the node list. At 658, a start command is sent for each node in the node list, causing the node to begin its initialization sequence.

Figure 7:
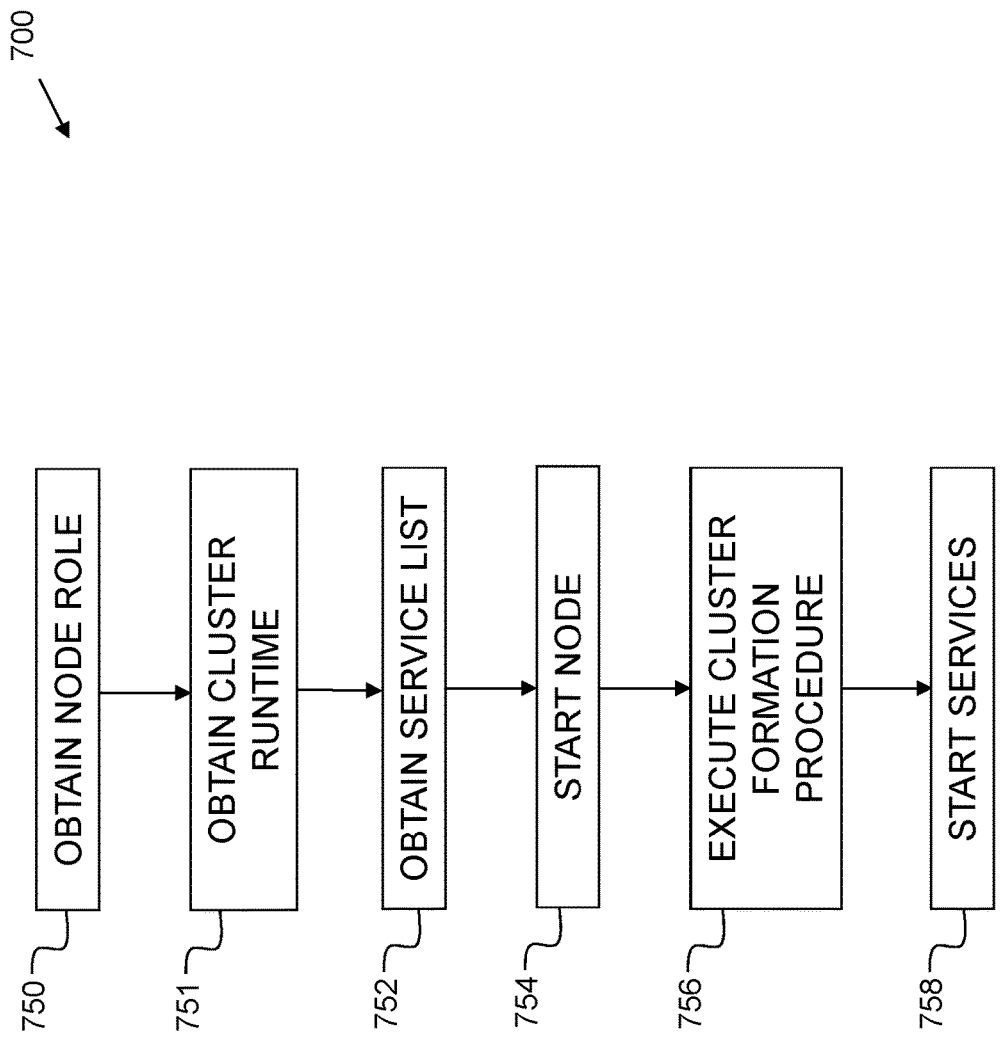
FIG. 7 is a flowchart indicating additional process steps for embodiments of the present invention.

FIG. 7 is a flowchart 700 indicating additional process steps for embodiments of the present invention. At 750, a node role is obtained. At 751, a cluster runtime environment is obtained. At 752, a service list is obtained. At 754, a node is started (initialized). At 756, a cluster formation procedure is executed. The cluster formation procedure can include cluster creation for a master node, or a cluster join operation for a non-master (role) node. At 758, services are started. Embodiments may further include determining a cluster runtime environment and starting the one or more services from the service list based on the determined cluster runtime environment (e.g., Hadoop MapReduce or Spark).

Figure 8:
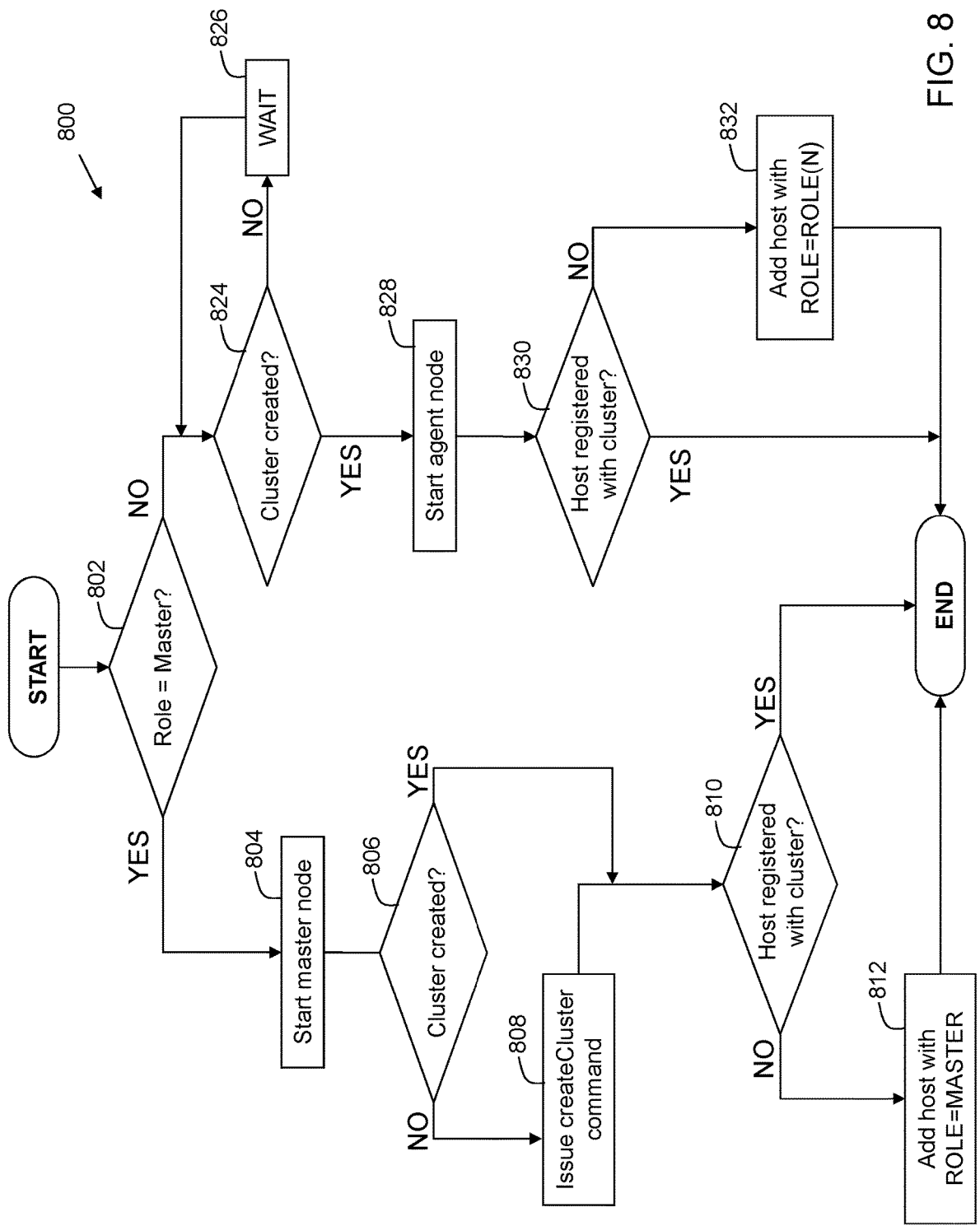
FIG. 8 is a flowchart indicating additional process steps for embodiments of the present invention.

FIG. 8 is a flowchart 800 indicating additional process steps for embodiments of the present invention. At block 802, it is determined whether the role of the node is master. The process proceeds in one of two directions based on this determination.

If at block 802, the determination is yes, then at block 804 the master node is started. At block 806, it is determined whether a cluster has been created. If not, at block 808, a createCluster command is issued, and the process proceeds to block 810. At block 810, it is determined whether a host is registered with the cluster. At 806, if the determination was yes, the process proceeds to block 810 as well. At block 810, it is determined whether a host is registered with the cluster. If not, a host is added with the role of master, and the process ends. If at block 810, the answer was yes, the process ends.

If at block 802, the determination was no, indicating the role of the node is not master, then the process proceeds to block 824. At block 824, it is determined whether a cluster was created. If not, the process proceeds to block 826 for waiting for the master node to be created. The process then returns to block 824.

If at block 824, the determination is yes, the process proceeds to block 828 where an agent node is started. At block 830, it is determined whether a host is already registered with the cluster. If not, the process proceeds to block 832 where a host is added with the role of Role(N), which is non-master, and ends. If at block 830, the determination is yes, the process ends.

In embodiments, the querying for the master node can be based on a name, IP address, or other suitable identifier. The node may be started as a container or virtual machine. In some embodiments, the node may be started as a native process executing directly on host hardware.

Figure 9:
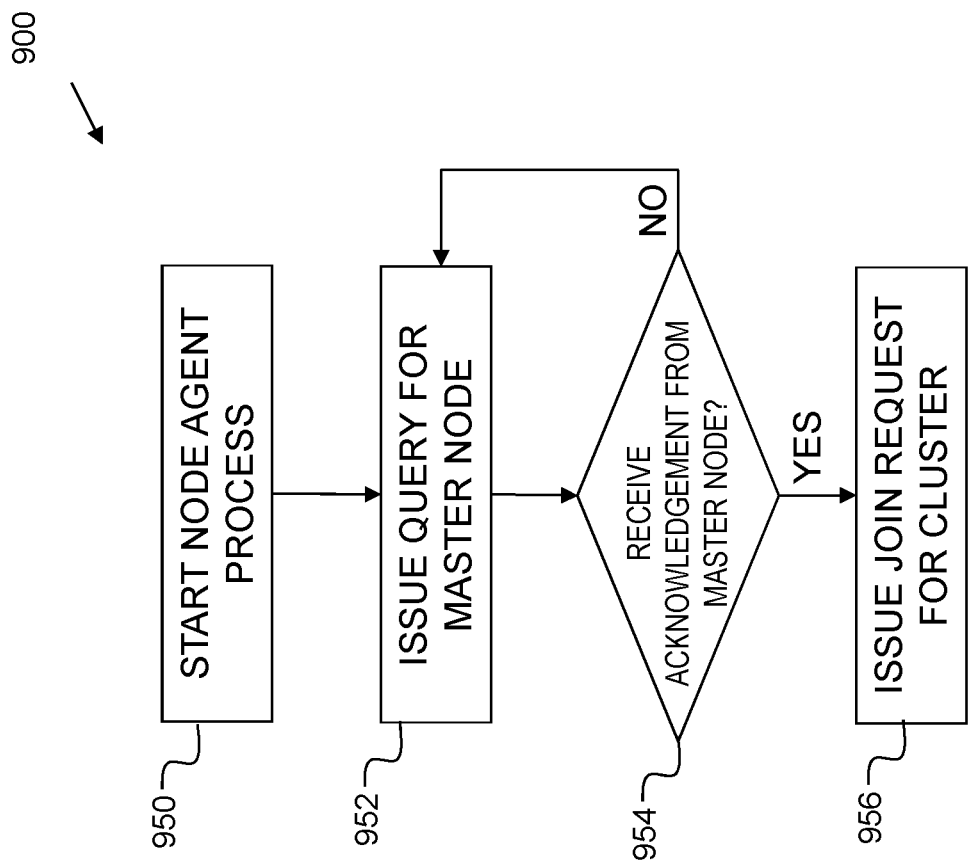
FIG. 9 is a flowchart indicating process steps for role node initialization.

FIG. 9 is a flowchart indicating process steps 900 for role node initialization. In process step 950, a node agent process is started (e.g., 222 in FIG. 2). In process step 952, a query is issued for the master node. In the example of FIG. 2, the master node is 210. In process step 954, a check is made to determine if acknowledgement is received from the node server 218 executing on the master node 210. If not, the process continues back to 952 to periodically issue a query for the master node until the master node is ready. If yes, the process continues to process step 956, using information provided by the acknowledgement that is needed to join the cluster, such as unique identifiers, handles, and/or other cluster-specific information. In process step 956, a join request is issued to the master node to join to the cluster.

Embodiments include processor instructions, that when executed by the processor, perform the following steps. In response to identifying the obtained role as a non-master, a node agent process is started. A query is issued for a master node. While waiting for an acknowledgement from the master node, the role node can initialize itself and start any services specified in its node description file. This saves time since the role node can bring up services while waiting for the master node to be ready. Once the master node is ready, an acknowledgement is received from the master node. A join request is issued to the master node in response to receiving the acknowledgement. Accordingly, when a node is in a non-master role, it begins initialization, and determines whether the master node is running. If so, the non-master node joins the cluster. If not, it periodically checks whether the master node is running, and in response to a determination that the master node is ready, the role node then joins the cluster.

FIG. 10 is an exemplary cluster configuration description 1000 in accordance with embodiments of the present invention. Cluster configuration description 1000 contains a hardware section 1004 that describes minimum hardware requirements for executing the nodes, as well as an application name and/or other identifier for the cluster-based application. In the example, the application name is content_delivery03. Section 1008 contains a node list, describing the node types and minimum number of instances required to form the cluster. In embodiments, each type refers to a node description file, such as that shown in FIG. 3. As part of the cluster creation process, the cluster configuration system 102 reads the cluster configuration description 1000, and then creates the nodes of each type, by retrieving and executing a corresponding node description file, similar to that shown in FIG. 3. The min_instance field describes how many nodes of each type are part of the initialization process. Embodiments may include additional information in the cluster configuration description, including, but not limited to, connectivity information, operating system information, power requirements, and/or redundancy requirements. In embodiments, the cluster configuration description 1000 is implemented in a YAML format, or other suitable data format.

Note: the terms "Hadoop," "Apache," "Ambari," "Spark," "Kubernetes," "Docker," and/or "MapReduce" may be subject to trademark rights in various jurisdictions throughout the world and is/are used here only in reference to the products or services properly denominated by the mark(s) to the extent that such trademark rights may exist.

As can now be appreciated, disclosed embodiments provide cluster creation using self-joining cluster nodes. Each node within a cluster is assigned a role of master or non-master. A master node initializes and creates a cluster. A non-master, or "role" node initializes and joins a cluster established by the master. If the master has not yet initialized, the non-master node waits until the master node is operational, and then joins the cluster. A description file associated with each node describes the services and configuration required for the node's assigned role. In this way, non-master nodes can be spawned independently of the master node, enabling for a greater level of scalability, improved fault tolerance, and increased availability.

In embodiments, a docker/container image is created for each type of cluster node. Each type of node has a specific role in the cluster. Appropriate initialization scripts and entry scripts are included such that the node has the information regarding which processes to start. As part of the cluster creation, a deployment description (e.g., a YAML file) is created and provided to a container orchestrator such as Kubernetes (k8s). The k8s create and start the containers in the different hosts, with each node being self-aware, thereby improving the efficiency in scalability and/or failover situations.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for cluster creation, comprising:
    obtaining a cluster configuration description for a cluster, wherein the cluster configuration includes a minimum number of instances required to form the cluster;
    deriving a node list from the cluster configuration description, wherein the node list includes a plurality of nodes;
    creating a node description file for each node in the node list, the node description file including a set of initialization scripts and entry scripts within the node that contain information regarding which processes that are executed by the node upon startup, wherein creating the node description file includes creating a first service list comprising a first set of services and corresponding version for each service from the first service list, and a second service list comprising a second set of services and corresponding version for each service from the second service list;
    selecting one of the first service list or the second service list for use during node initialization based on a selected cluster runtime environment;
    determining a corresponding host machine for each node in the node list; and
    sending a start command for each node to its corresponding host machine.

2. The method of claim 1, wherein deriving a node list comprises deriving a list including at least one container.

3. The method of claim 1, wherein deriving a node list comprises deriving a list including at least one virtual machine.

4. The method of claim 1, wherein deriving a node list comprises deriving a node list including at least one container and at least one virtual machine.

5. The method of claim 4, wherein deriving a node list further comprises deriving a node list including at least one native application.

6. The method of claim 1, wherein creating a node description comprises creating a file in a YAML format.

7. The method of claim 1, wherein creating a node description includes creating a first subset of configuration information for a first cluster runtime environment and creating a second subset of configuration information for a second cluster runtime environment.

8. The method of claim 7, further comprising:
    determining a cluster runtime environment; and
    selecting the first subset of configuration information or the second subset of configuration information based on the cluster runtime environment.

9. The method of claim 1, wherein creating a node description file includes creating a processor requirements entry.

10. The method of claim 1, wherein creating a node description file includes creating a memory requirements entry.

11. The method of claim 1, further comprising restarting a node upon detecting a failure condition.

12. A computer program product for an electronic computing device comprising a computer readable storage medium having program instructions embodied therewith, the program instructions executable by a processor to cause the electronic computing device to:
    obtain a cluster configuration description for a cluster, wherein the cluster configuration includes a minimum number of instances required to form the cluster;
    derive a node list from the cluster configuration description, wherein the node list includes a plurality of nodes;
    create a node description file for each node in the node list by creating a first service list comprising a first set of services and corresponding version for each service from the first service list, and a second service list comprising a second set of services and corresponding version for each service from the second service list, the node description file including a set of initialization scripts and entry scripts within the node that contain information regarding which processes that are executed by the node upon startup;
    select one of the first service list or the second service list for use during node initialization based on a selected cluster runtime environment;
    determine a corresponding host machine for each node in the node list; and
    send a start command for each node to its corresponding host machine.

13. The computer program product of claim 12, wherein the computer readable storage medium includes program instructions executable by the processor to cause the electronic computing device to derive the node list including at least one container.

14. The computer program product of claim 12, wherein the computer readable storage medium includes program instructions executable by the processor to cause the electronic computing device to create the node description including a first subset of configuration information for a first cluster runtime environment and a second subset of configuration information for a second cluster runtime environment.

\* \* \* \* \*